United States Patent [19]

Tsunekawa

[11] 4,388,610
[45] Jun. 14, 1983

[54] APPARATUS FOR READING DRAWINGS

[75] Inventor: Shou Tsunekawa, Kawasaki, Japan

[73] Assignee: Tokyo Shibaura Denki Kabushiki Kaisha, Kawasaki, Japan

[21] Appl. No.: 226,645

[22] Filed: Jan. 21, 1981

[30] Foreign Application Priority Data

Jan. 28, 1980 [JP] Japan .................................. 55-7771

[51] Int. Cl.³ ............................................. G06K 9/00
[52] U.S. Cl. ....................................... 382/8; 235/454; 250/566; 340/146.3 MA; 364/491; 382/23; 382/33; 382/56; 382/57
[58] Field of Search .......... 340/146.3 AC, 146.3 MA, 340/146.3 SY, 146.3 H; 364/200 MS File, 900 MS File, 515, 491, 518, 520; 250/556, 571, 555, 557, 566–568; 235/454; 178/18

[56] References Cited

U.S. PATENT DOCUMENTS

| | | | |
|---|---|---|---|
| 3,636,513 | 1/1972 | Tisdale ...................... | 340/146.3 AC |
| 3,692,237 | 9/1972 | Fiderer ............................... | 235/454 |
| 3,693,168 | 9/1972 | Halkyard et al. .................... | 364/900 |
| 3,705,956 | 12/1972 | Dertouzos ................. | 340/146.3 SY |
| 3,895,358 | 7/1975 | Pearl ................................... | 364/900 |
| 3,924,244 | 12/1975 | Seitz .................................... | 364/900 |
| 3,930,237 | 12/1975 | Villers .................................. | 364/900 |
| 4,014,000 | 3/1977 | Uno et al. ................. | 340/146.3 MA |
| 4,272,756 | 6/1981 | Kakumoto et al. ........... | 340/146.3 H |

OTHER PUBLICATIONS

Shapiro, "Inexact Matching of Line Drawings in a Syntactic Pattern Rec. System," *Pattern Recognition*, vol. 10, No. 5/6, 1978, pp. 313–321.

Clement, "The Extraction of Line-Structured Data from Eng. Drawings," *Pattern Recognition*, vol. 14, Nos. 1–6, 1981, pp. 43–52.

*Primary Examiner*—Leo H. Boudreau
*Attorney, Agent, or Firm*—Schuyler, Banner, Birch, McKie & Beckett

[57] ABSTRACT

This disclosure concerns to apparatus for reading drawings. The apparatus of this invention is an apparatus for reading symbols on a drawing wherein the drawing comprises a preprinted lattice pattern with orthogonal lines forming unit rectangular areas and each symbol or portions thereof is drawn within one or more of the unit area each symbol is drawn so that the portion of the symbol within a unit area has a predetermined size and position with respect to the sides of the unit area.

The apparatus includes scanning means for scanning several discrete points within each unit area and producing binary data for each scanned point, storage means for storing standard pattern data, identifying means, coupled to the storage means and the scanning means, for comparing the binary data with the pattern data to identify the symbol or symbol portion within the scanned unit area, the identifying means producing a code representing the symbol or symbol portion when identity is established, detecting means for detecting the position of the scanned unit area, and drawing storage means, coupled to the detecting means and the identifying means, for storing the code at an address defined by the detecting means, the drawing storage means storing a code for each unit area scanned by the scanning means.

8 Claims, 15 Drawing Figures

APPARATUS FOR READING DRAWINGS

BACKGROUND OF THE INVENTION

This invention relates to apparatus for reading mechanical or electrical drawings containing at least a segment and a symbol (e.g., logic circuit diagram).

Lately, it has become important in many enterprises to efficiently keep plans in quantities and to efficiently search a desired drawing when ordering parts. If data contained within the drawings can be easily inputed in the same manner as done with data for calculations, the efficiency of keeping and searching drawings is greatly improved. Therefore, various methods to input the data contained within drawings into computers are proposed. For example, the following methods are known: a card input method in which an operator symbolizes the connectional relations of a drawing drawn by a designer; a tablet input method in which figures are drawn on the tablet; and a light pen method in which information is inputed representing the selected spot on a cathode-ray tube screen. All of these methods, however, require manual labor when the drawing's data are inputed into a computer. These methods have a disadvantage that there are many input errors requiring delays and costly engineering time to detect and correct. Therefore, apparatus which are capable of directly reading drawings are desired. The prior art, however, has not been able to effectively read drawings due to the following general characteristics of drawings: (1) Many symbols are used which are interconnected by segments (i.e., connecting lines) to produce the drawing; (2) The segments and symbols are interspersed within the drawing; consequently, it is necessary to discriminate each of them. This is difficult because a small section of a pattern can not be distinguished to determine its identity; that is, whether it is a part of a segment or a symbol, and if a symbol, its value. (3) The positions of the segments and symbols are randomly decided beforehand.

These characteristics of drawings have prevented the application of pattern recognition technology developed in the field of optical character recognition. Even if such technology is applied to the drawings, the requisite apparatus is unusually large and costly; moreover, the operational time of such apparatus is unreasonably long and unsatisfactory results are obtained.

SUMMARY OF THE INVENTION

It is one object of this invention to provide an apparatus capable of directly and automatically reading drawings.

It is another object of this invention to produce a compact apparatus for reading drawings in which the process time is small and accurate results can be obtained.

The apparatus of this invention is an apparatus for reading symbols on a drawing wherein the drawing comprises a preprinted lattice pattern with orthogonal lines forming unit rectangular areas and each symbol or portions thereof is drawn within one or more of the unit areas. Each symbol is drawn so that the portion of the symbol within a unit area has a predetermined size and position with respect to the sides of the unit area.

The apparatus comprises a scanning means for scanning several discrete points within each unit area and producing binary data for each scanned point; storage means for storing standard pattern data; identifying means, coupled to the storage means and the scanning means, for comparing the binary data with the pattern data to identify the symbol or symbol portion within the scanned unit area, the identifying means producing a code representing the symbol or symbol portion when identity is established; detecting means for detecting the position of the scanned unit area; and drawing storage means, coupled to the detecting means and the identifying means, for storing the code at an address defined by the detecting means, the drawing storage means storing a code for each unit area scanned by the scanning means.

BRIEF DESCRIPTION OF THE DRAWINGS

Other objects and features of the invention will become apparent to those skilled in the art as the disclosure is made in the following description of a preferred embodiment of the invention, as illustrated in the accompanying sheet of drawings, in which:

FIG. 2 (a) ... (e) show the standard symbols and their proper positions within the rectangular areas of the grid.

DESCRIPTION OF THE PREFERRED EMBODIMENT

The principle of this invention will be explained below. Special drawing forms must be used in accordance with the instant invention. These forms have a preprinted lattice pattern with orthogonal lines forming unit rectangular areas upon which a designer will draw a mechanical or electrical circuit. The designer is required, according to the invention, to draw the symbols and segments which make up the circuit in a certain manner. That is, each identical symbol which represents an electrical or mechanical component is drawn within a resultant rectangular area defined by one or more unit adjacent rectangular areas. A particular symbol is drawn so that the portion of the symbol within a unit rectangular area has a predetermined size and position with respect to the sides of that unit area. Each segment representing electrical or mechanical connecting means (e.g., wire) and node is drawn within a unit rectangular area. Each particular segment is drawn so that it has a predetermined position with respect to the sides of the unit area.

With the method and apparatus of the invention, the designer does not draw these segments and symbols as particular codes, as employed in prior art, to represent the component or wire in interest. Rather, he will utilize the standard electrical/mechanical representations for the component or connecting means.

In the present invention, reading a drawing is accomplished by reading every unit rectangular area in sequence from left to right. In reaching each unit area, however, reading takes place by scanning in discrete steps at 32×32 points within the unit area. After scanning a unit area in this manner, information is obtained for each of the 32×32 points. This information is in the form of digital signals which indicates the presence or absence of a portion of the symbol or segment at each point within the unit rectangular area scanned. This information is then composed with stored information (i.e., standard pattern information) representing portions of standard symbols, and segments. After reading one unit area in this manner, scanning commences in the next unit area in the same manner. If identity is established during the comparison operation, a predetermined code representing a portion of the standard symbol or segment (i.e., standard pattern) is generated and stored in memory along with the precise location of this pattern on the drawing.

Because the invention is constructed as stated above, the invention is not subject to the abovementioned adverse characteristics involving the reading of drawings. Namely, pattern recognition technology developed in the field of optical character recognition can be applied to the apparatus of the invention because the identification process is executed within each unit of area on the drawing (i.e., a unit rectangular area). The identification method of the invention permits not only the identification of a portion of a known symbol representing a component, but also the connecting relationship among portions of symbols in adjacent rectangular areas at the same time.

Figure 1:
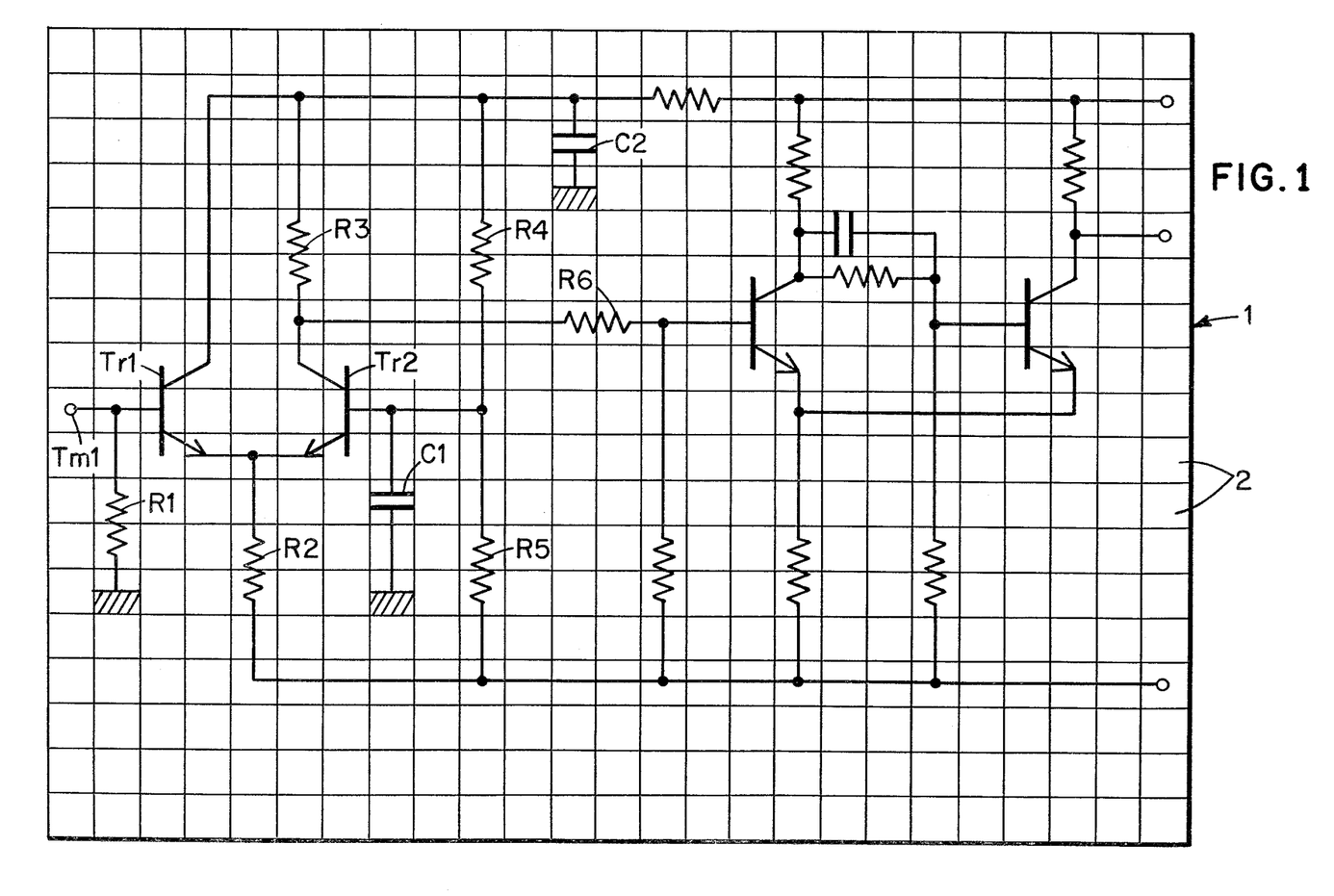
FIG. 1 shows an example of a plan drawing having an orthogonal grid pattern used in accordance with the invention.

FIG. 1 shows an example of a drawing which is inputed into the apparatus of the invention. A drawing form having preprinted lattice pattern 1 with orthogonal lines forming unit rectangular areas 2 is employed. For example, the size of each unit rectangular area 2 is 5 mm×5 mm. An electrical circuit, such as the one shown in FIG. 1, is then drawn on the form and contains symbols designating electrical components with appropriate identification (e.g., R1). This identification has been added solely to explain below the relationship between the segments and symbols.

Figure 2A:
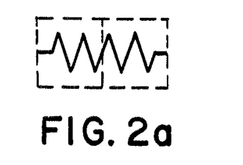
Figure 2B:
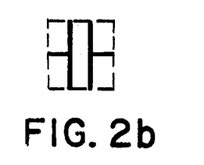
Figure 2C:
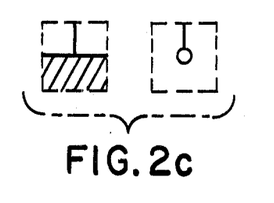
Figure 2D:
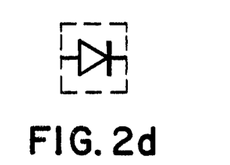
Figure 2E:
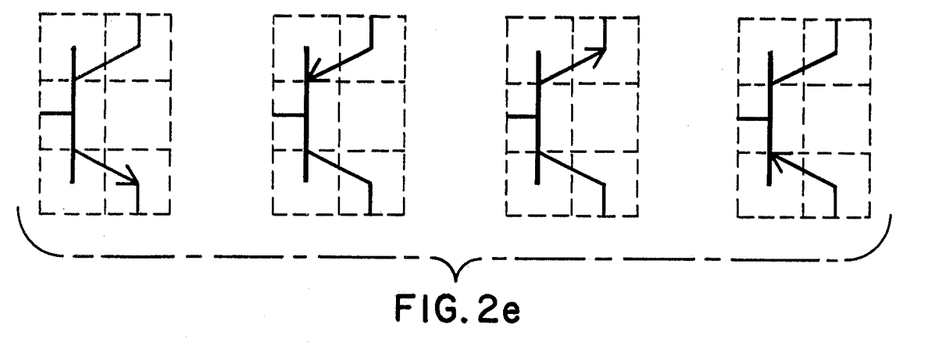
Figure 3:
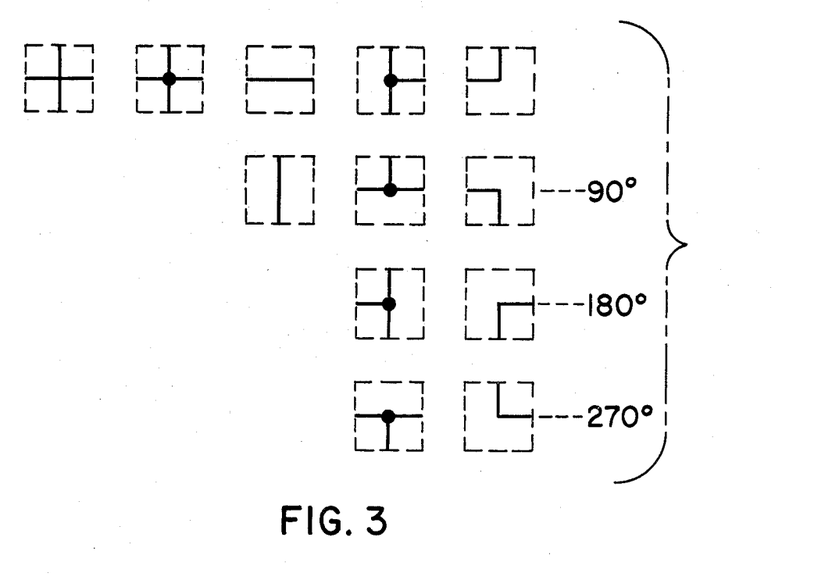
FIG. 3 shows the various kinds of segment patterns and their proper positions within the rectangular areas of the grid.

FIG. 2(a) . . . (e) show the various symbols used in FIG. 1, (i.e., a resistor, a capacitor, a diode, a transistor, an earth connection and a terminal) and the predetermined position with respect to the sides of the unit areas. Likewise, FIG. 3 shows the various segments used in FIG. 1, representing connecting wires and nodes and their predetermined position with respect to the sides of their unit area. These symbols or segments can be drawn so that they are oriented in other directions; that is, by rotating them 90°, 180°, or 270°. With the invention, the designer must draw the segments and symbols in a manner dictated by the following simple rules which permit the recognition of segments and symbols: 1. A segment (connecting line) must be a horizontal line, a vertical line, or a combination of both, which passes through the center of the unit rectangular area. 2. All symbols must be drawn to a predetermined size and position with respect to the sides of the unit areas. For example, each capacitor, earth connection and end terminal is drawn in one unit rectangular area, a resistor is drawn in a resultant area formed by two unit rectangular areas and transistor is drawn in a resultant area formed by five unit rectangular areas.

Figure 4A:
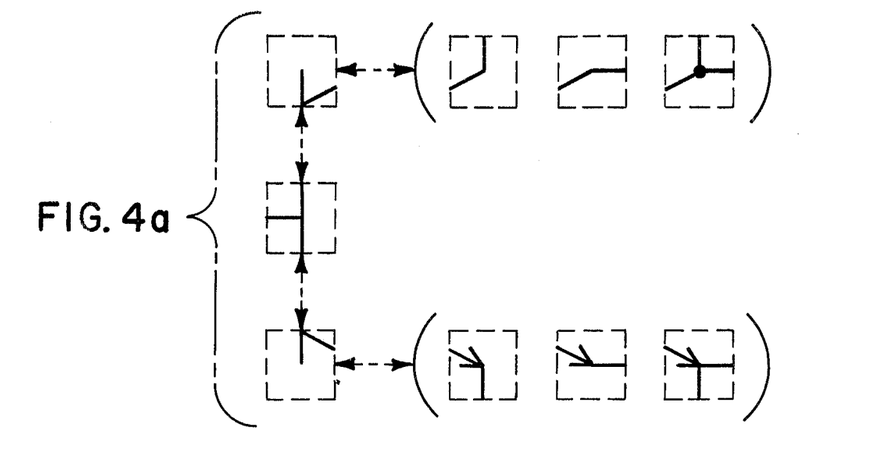
FIGS. 4(a) and (b) show standard patterns of NPN transistors and PNP transistors and their proper positions within the rectangular areas of the grid.
Figure 4B:
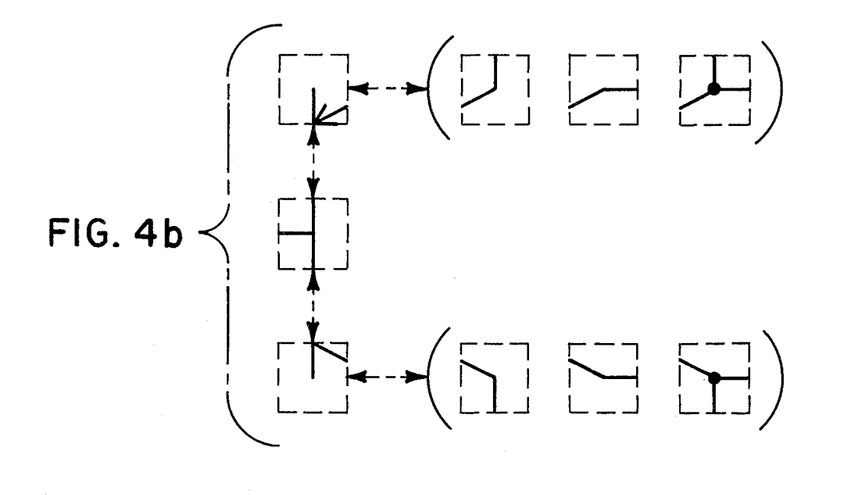

Under the above rule (1), there are twelve possible segments that can be placed within a unit rectangular area, as shown in FIG. 3. Clearly, some of the segments shown in FIG. 3 are the same as other segments, but rotated by 90°, 180°, or 270°. In fact, as shown in FIG. 3, there are five basic segments from which the other seven can be formed. Under the above rule 2, each transistor and resistor symbol consists of several standard patterns. For example, a NPN transistor consists of the standard patterns shown in FIG. 4(a) and a PNP transistor consists of the standard patterns shown in FIG. (b). In FIG. 4(a) and (b), the parentheses are used to show other portions which can be substituted in the adjacent unit areas for connecting to other symbols.

Rule 2 restricts the designer to draw each symbol in a predetermined size and shape. Any attempt to modify a symbol or segment from the shape or size stored as a standard pattern, without also modifying the stored standard pattern, will prevent identification of the figure. For example, a resistor must not be drawn in one unit rectangular area or in three unit rectangular areas. Moreover, in the case of a transitor, each portion of the symbol must be drawn so that it has a predetermined position with respect to the sides of the unit area. In the case of a transistor, the base must begin at the midpoint of a first side and the emitter and collector must each begin at the midpoint of a respective side adjacent that first side. Each emitter and collector are drawn in separate adjacent unit areas. The end portions of each emitter and collector are then drawn in yet another separate adjacent unit areas. These end portions can take the standard pattern form shown, in parenthesis, in FIGS. 4(a) and 4(b).

Figure 5:
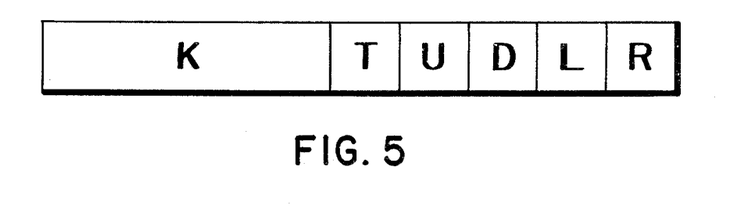
FIG. 5 shows a code format stored in the drawing memory of FIG. 6 representing the symbol or segment.

When an identity is established between the portion and a standard pattern, a predetermined code representing a portion of the standard symbol or segment is generated and stored in memory along with the precise location of this portion on the drawing. FIG. 5 shows an example of a format of a predetermined code. The K part, having n bits, designates a code corresponding to one of the standard patterns. The first bit and/or the second bit of the n bits indicates if a first "flag" is present. That is, if a "1" is present, processing by the editing circuit, as will be described later, takes place in a manner different than if this bit is "0." The T part, having one bit, designates whether the pattern, in the rectangular area, has any connecting ends. If T is "1" then the pattern has at least one connecting end; however, if T is "0", then the pattern has no connecting ends (i.e., blank area). The next 4 bits (i.e., U, D, L, and R) designate the connecting information regarding the standard pattern. That is, whether the pattern has an upper end (U) a lower end (D), a left end (L), or a right end (R). For example, when each bit of U, D, L, and R is "1," there is a connecting end in each respective direction: up, down, left and right.

Figure 6:
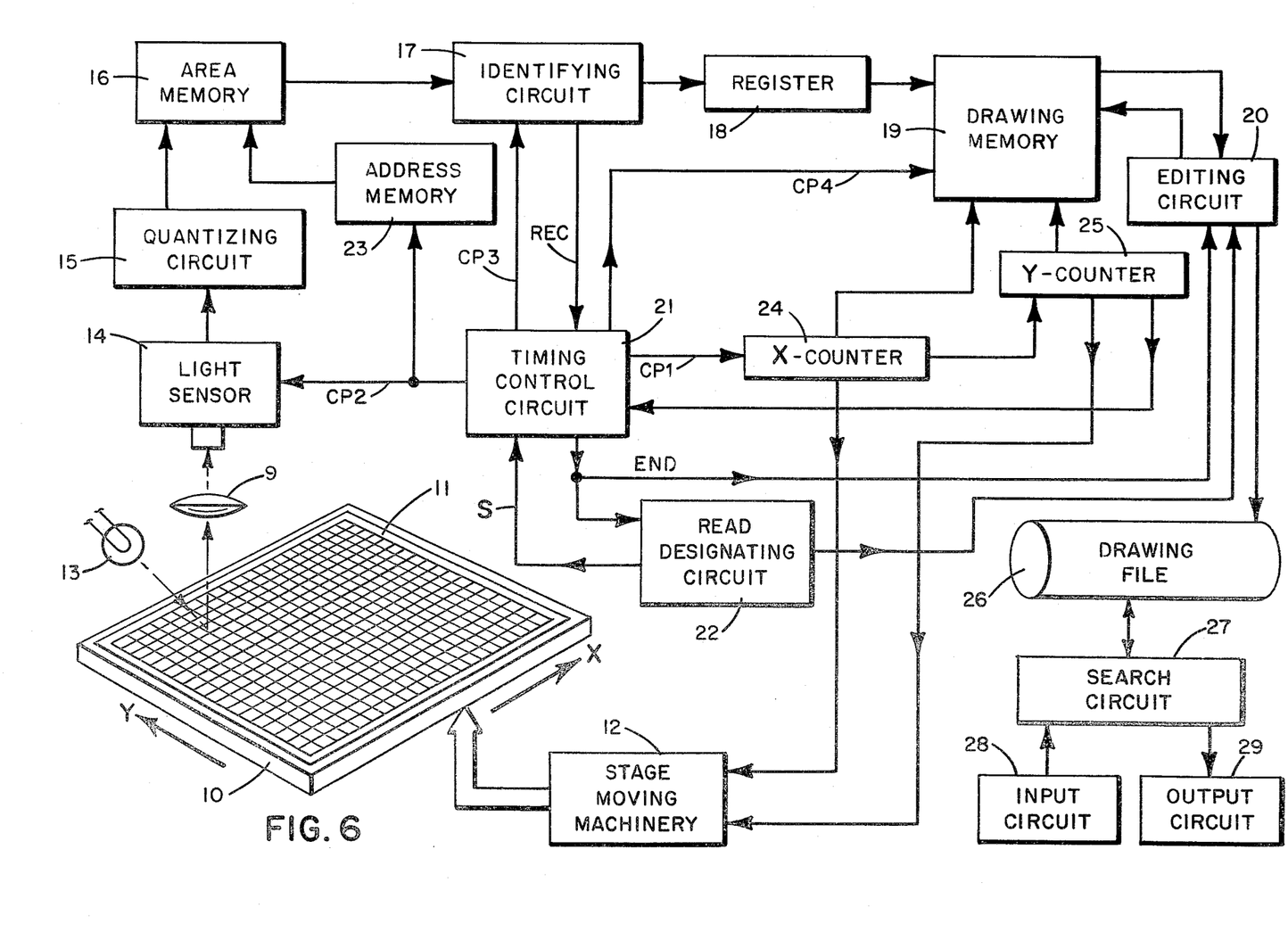
FIG. 6 shows a block diagram of an embodiment of the invention.

FIG. 6 shows a structure of one embodiment of the invention. A drawing 11 comprises a form having a preprinted lattice pattern with orthogonal lines forming unit rectangular areas upon which a designer will draw a mechanical or electrical circuit. As explained with reference to FIGS. 1–4, each electrical symbol which represents an electrical or mechanical component is drawn within a resultant retangular area defined by one or more unit rectangular area. A particular symbol is drawn so that the portion of the symbol within a unit rectangular area has a predetermined size and position with respect to the sides of the unit areas. Each segment representing an electrical or mechanical connecting means (e.g., wire) and node is drawn within a unit rectangular area and has a predetermined position with respect to the sides of the unit area. Drawing 11 is put on a X-Y stage 10 which is moved by a prior art stage moving machinery 12 step by step, each step representing the distance of a unit rectangular area in the X and Y direction. Upon reading a unit rectangular area, the stage moves the drawing in the X direction to the next unit area and continues to do so until all units along a line are read. The stage is then moved to the next lower Y step at the beginning of the next line and reading continues, in steps, along this next line.

Light source 13 illuminates drawing 11 and the light reflected from the drawing is focused on a two-dimensional light sensor 14 by a lens 9. Two-dimensional light sensor is, for example, a charge coupled sensor of the self-scanning type comprising an array of 32×32 sensor elements. In this embodiment, the image within each unit rectangular area of drawing 11 is detected by light sensor 14. That is, in reading each unit area, scanning takes place in discrete steps at 32×32 points within the unit area. Electrical signals converted by the sensor elements are supplied to a quantizing circuit 15 and converted into binary signals. The binary signals are supplied to an area memory 16 which stores the data obtained at each of the 32×32 points. This data is then supplied to identifying circuit 17 which compares the data with standard pattern data stored within circuit 17 representing portions of standard symbols and segments. Circuit 17 identifies the kind of symbol/segment drawn in each unit rectangular area by examining the data stored in area memory 16.

The methods used to identify the kind of symbol/segment is well known in the pattern recognition field. For example, the pattern matching method developed in OCR and the characteristics abstracting method, etc., can be used. For example, such methods are described in Pick, G. G. et. al.: The Solenoid Array—A New Computer Element, IEEE Trans. EC, Feb. 1964, pp. 27-35, and Ball, G. H.: The Application of Integral Geometry to Machine Recognition of Visual Patterns, 1962, Wescon Conv. Record, 6.3. If identity is established, circuit 17 generates a code (see FIG. 5) which represents the portion of the symbol/segment.

Register 18 receives the code produced by circuit 17, temporarily stores it, and supplies it to a drawing memory 19. Drawing memory 19 has sufficient capacity to store a code for each unit rectangular area on drawing 11. The position on the drawing which for each code is designated by X counter 24 and Y counter 25.

A timing control current 21 controls the timing of the various elements in FIG. 6 including sensor 14, address counter 23, identifying circuit 17, drawing memory 19, an editing circuit 20, a read designating circuit 22 and X counter 24. The read designating circuit, when activated by a user, produces a start signal S to commence the scanning and the reading operation. Circuit 22 also produces an end of processing signal which is supplied to editing circuit 20, which will be described below.

Operation of the embodiment shown in FIG. 6 will be explained using the timing chart shown in FIG. 7. Drawing 11 is put at a predetermined position on X-Y stage 10. When a start signal S is supplied into timing control circuit 21 by pushing a key of read designating circuit 22, the reading of drawing 11 begins. Circuit 21 then produces pulse signals CPI which are counted in X counter 24. X counter 24 designates the X directional position of the unit rectangular area and Y counter 25 designates the Y directional position of the unit rectangular area. The contents (count numbers) of X counter 24 and Y counter 25 are supplied into stage moving machinery 12. Machinery 12 moves X-Y stage 10 so that the rectangular area designated by the count of X counter 24 and Y counter 25 will be positioned under light sensor 14. As a result, the pattern within the unit rectangular area is sensed by light sensor 14.

After X-Y stage 10 stops, timing control circuit 21 supplies a set of clock pulses CP2 to light sensor 14. Each set of pulses CP2 contains 1024 pulses (32×32). Then, light sensor 14 begins its scanning in discrete steps at 32×32 points within the unit area and supplies output electrical signals to quantizing circuit 15 which converts the outputs signal at each point to a binary value (i.e., I/O). Clock pulses CP2 are also supplied to address counter 23 which designates each 32×32 point within the unit area. The address of each designated point and its associated binary value is sequentially stored in memory 16.

When the data at each of the 32×32 points within a unit rectangular area are stored in area memory 16, timing control circuit 21 generates identifying start signals CP3 which are supplied to identifying circuit 17. Identifying circuit 17 begins the comparison process by comparing the data each point (i.e., element data) with stored information (i.e., standard pattern information) representing portions of standard symbols and segments. The standard pattern information also contains data representing a blank unit area. That is, the figure within the unit area is compared with standard patterns. When identity is established, circuit 17 completes the identifying process by generating a predetermined code (see FIG. 5) and supplying a identifying end signal (REC) into timing control circuit 21. This predetermined code is supplied to register 18 at the same time the REC signal is supplied to circuit 21. When signal REC is supplied to circuit 21, timing control circuit 21 supplies a write signal CP4 into drawing memory 19. At this time, the predetermined code stored in register 18 is supplied to drawing memory 19 at an address designated by X counter 24 and Y counter 25. Upon storing the code for a particular pattern, within a unit rectangular area, in drawing memory 19, timing control circuit 21 again supplies a clock pulse CP1 into X counter 24, accordingly, the count number of the X counter increases by one. As a result, stage moving mechinery 12 moves X-Y stage 10 in the X direction according to the count number in counter 24, and the figure in the next adjacent unit rectangular area in the X direction is received by light sensor 14. Circuit 21 then supplies pulses CP2 to read this unit area. Similarly, X-Y stage 10 moves sequentially to every unit rectangular area to scan and read each of the figures. A code is produced for each figure associated with a unit area scanned, and is stored in memory 19 at a particular address.

Figure 7:
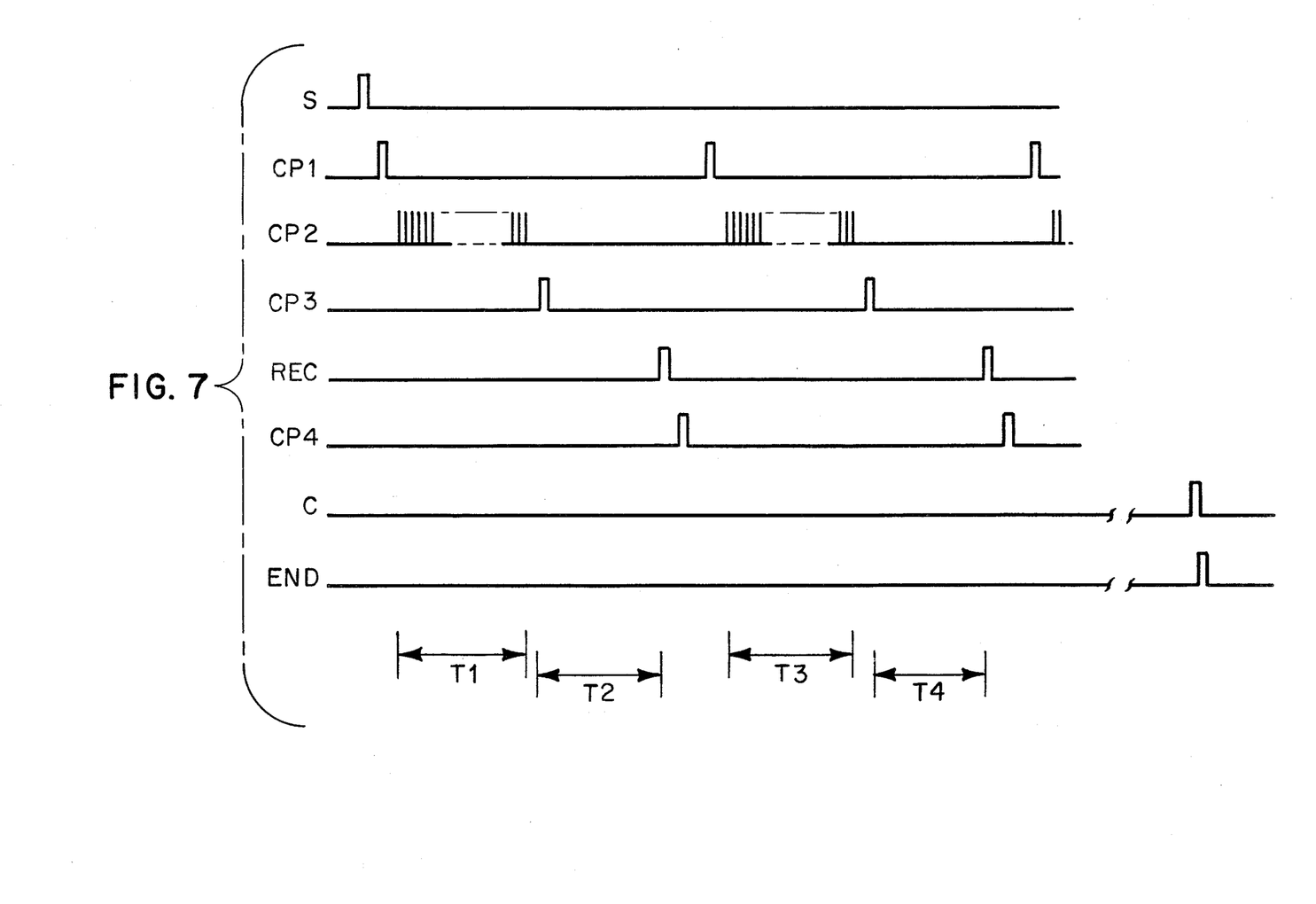
FIG. 7 shows a timing chart showing the timing sequence of the pulses in the embodiment of FIG. 6.

As shown in FIG. 7, the storing of the binary signals from circuit 15 in area memory 16 is executed in time slots T1, T3, while the comparison operation in identifying circuit 17 is executed in time slots T2, T4. The time period between T2 and T3 (T4 and T5, etc.) represents generation of the code and storage in memory 19.

After all the figures of the rectangular areas are identified Y counter 25 supplies a carry signal C to timing control circuit 21. Then timing control circuit 21 sends a signal END to editing circuit 20 and read designating circuit 22. Editing circuit 20 begins the operation mentioned below. Read designating circuit 22 activates a lamp (not shown) indicating the end of the reading operation.

Figure 8:
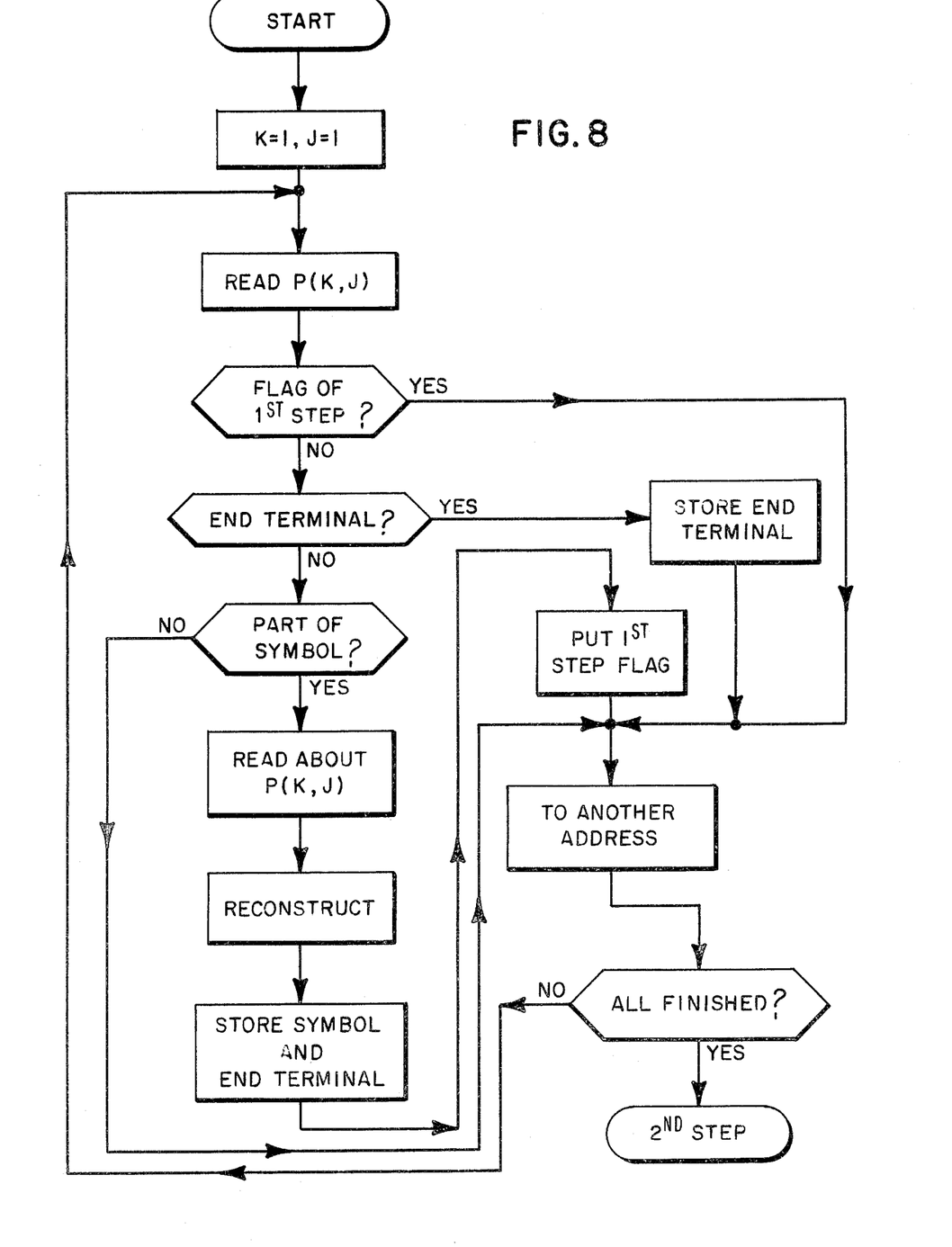
FIG. 8 shows a flow chart of a first step of the editing circuit in the embodiment shown in FIG. 6.
Figure 9:
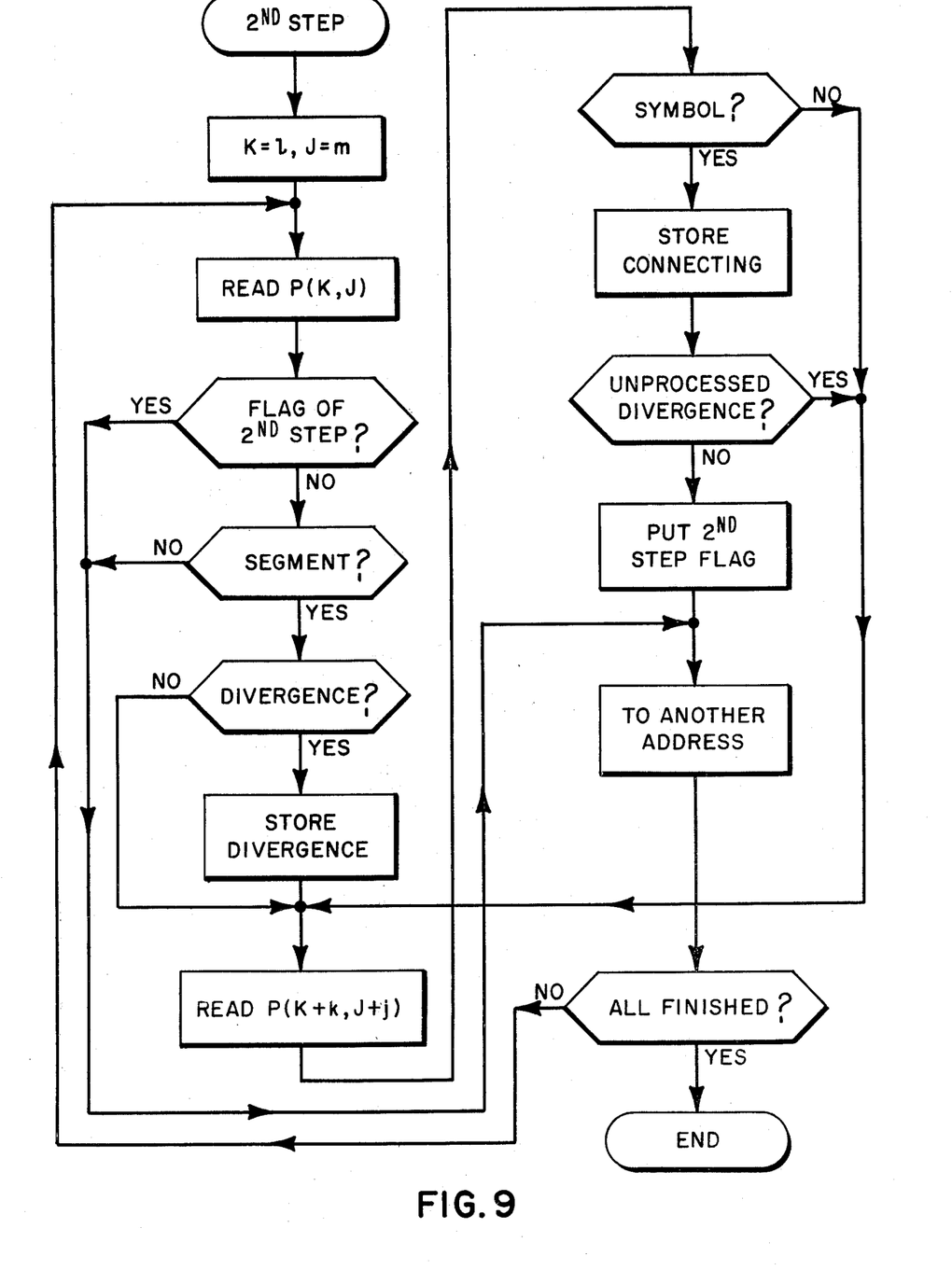
FIG. 9 shows a flow chart of a second step of the editing circuit in the embodiment shown in FIG. 6.

Many kinds of processes can be executed in editing circuit 20. For example, this circuit can produce a connecting table from the data stored in drawing memory 19. This table is stored in a drawing file with a designating number to be retrieved by a user; upon being retrieved, the system utilizes the connecting table to reconstruct the circuit represented by the table. FIGS. 8 and 9 show flow charts for performing the operations of editing circuit 20 to form a connecting table. As shown, the address of the unit rectangular area in drawing memory 19 is designated by (K,J) and its code (i.e., FIG. 5) is designated by P(K,J). The process of editing circuit 20 comprises a first step (FIG. 8) in which drawing memory 19 is examined to determine the precise symbol and segment which are formed from one or more patterns, and a second step (FIG. 9) in which the connecting relations between the symbols and segments are determined.

Regarding the first step, the content P(K,J) in each address of drawing memory 19 is sequentially read out and the symbols are detected. P(1,1) is read out from drawing memory and a determination is made if the first step has already examined this content. That is, if this content was already examined, a first flag (i.e., a "1") will be placed at the first bit of the K part of the predetermined code. In that case, the system will move on to examining the next content. If, on the other hand, the first bit is "0," examination of that code will continue. If the first step of a particular code has concluded (i.e., flag), the content of the next address is examined. If the first step as to a particular code was not finished, a determination is made if the figure is a terminal. If the figure is a terminal, the position of the unit rectangular area, corresponding to the terminal, is temporarily stored in the editing circuit as part of the connecting table. If not a terminal, a determination is made if the figure is part of a symbol. If so, the figures adjacent the examined unit rectangular area are read out from drawing memory 19 and examined. The kind of the symbol drawn within several rectangular areas is detected by reconstructing the standard patterns in the rectangular areas. That is, the circuit combines the patterns in adjacent unit areas to reconstruct a known symbol. When a symbol is detected, the type of symbol, the identity of its position of the unit rectangular area are temporarily stored in the editing circuit as part of the connecting table. As discussed above, each time a unit area is examined by the editing circuit, the editing circuit places a flag (i.e., "1") in the first bit of the K portion of the code so that the code will not be reexamined. This process is continued until all symbols are identified from the codes stored on memory 19.

During the next second step (see FIG. 9) the connecting relations between the symbols are examined. This process is executed by repeatedly tracing segments in a connected direction and temporarily storing the symbol to which the segments are connected in the editing circuit as part of the connecting table. In this embodiment, the connecting relationship among each rectangular area is easily detected by examining the U, D, L, and R parts of the code (see FIG. 5). If during the tracing process a divergence point is encountered, the point is stored and one of the segments in the divergent directions is traced. After this segment is fully traced, the other divergent segment is traced from the stored divergence point. Likewise, storing continues until all segments from the stored divergent point is examined. In the second step, repeated tracing is avoided by utilizing a second flag which indicates that the second step has been performed in the examined unit rectangular area. That is, the second bit of the n bits of the K part (see FIG. 5) of the code indicates if a second flag is present. That is, if this content was already executed by tracing a second flag (i.e., "1") will be placed at the second bit. In that case, the system will move on to examining the next segment.

Regarding the second step (FIG. 9), tracing begins at the end terminal of a symbol (e.g., $K=1$, $J=m$). This content (i.e., P(1,m)) is read out and a determination is made if the second step has already examined this content. When the second step as to the particular code is finished, tracing is executed for another address. If the second step is not finished in the rectangular area, a determination is made if the figure is a segment. If the figure is not a segment (e.g., a part of symbol) tracing is executed for another address. The system determines this by examining the K part of the code; this indicates if the figure is a segment or part of a symbol. If the figure is a segment, a determination is made if the figure contains a divergent point. In that case the point is stored and one of the segments in a divergent direction is traced. After this segment is fully traced, the other divergent segment is traced from the stored point. If the figure does not contain a divergent point, the segment is traced.

A trace is executed by reading $P(K+k, J+j)$, where $K+k$, $J+j$ represents an adjacent connected unit area. The adjacent connected area (i $K+k$, $J+j$) is determined by editing circuit 20 from examining the connecting data (i.e., T, U, D, L, R) of the predetermined code (see FIG. 5) for the adjacent unit areas. For example, if the circuit has just examined P(K,J) which contains $T=1$, $U=1$, $D=1$, $L=0$ and $R=0$, the circuit will sense that this unit area represents a vertical straight segment. If tracing in the upward direction, the circuit will examine the adjacent unit area which is positioned directly above this examined unit area. The circuit will detect if this unit area code has a $D=1$ which would convert with the $U=1$ of the examined unit area. This process continues in all directions until all segments are examined.

Figure 10:
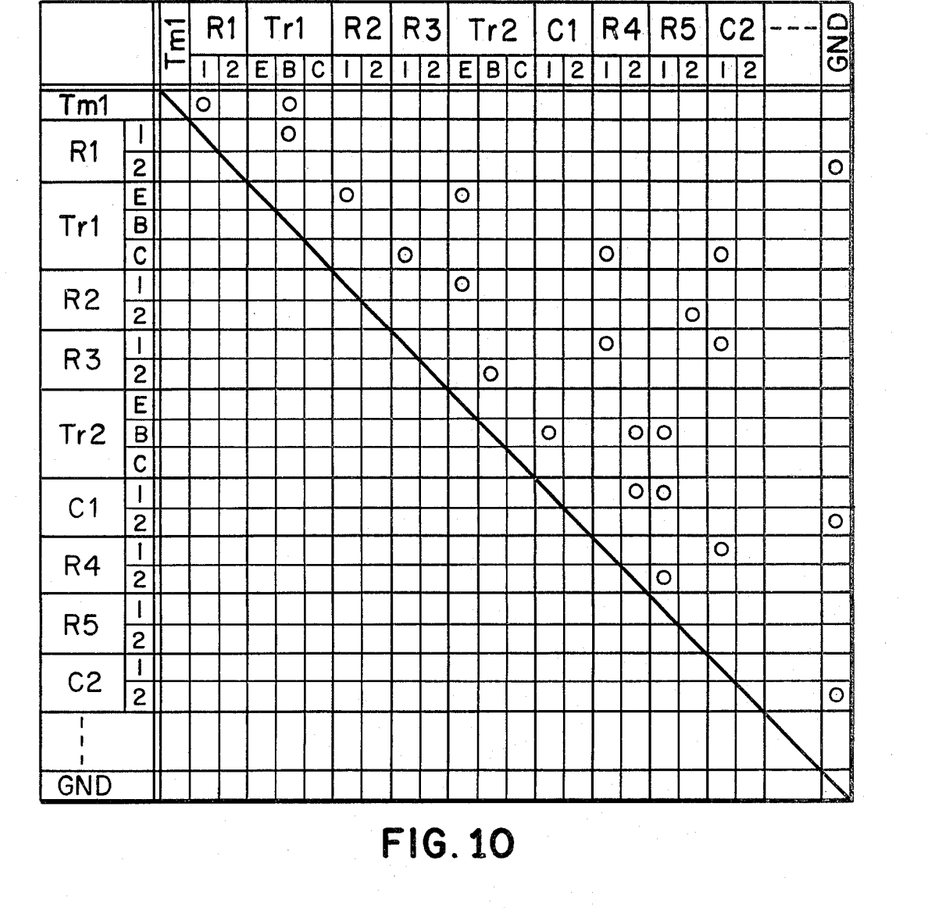
FIG. 10 shows a connecting table representing the interconnection among the symbols of FIG. 1, which is determined and stored by the editing circuit of FIG. 6.

If during tracing a symbol is encountered, the connecting relationship between that symbol and a previously examined and connected symbol is temporarily stored in the connecting table. Then, if there are any divergent segments which are unprocessed, they are examined. As discussed, the tracing is executed from the divergent points which have been stored. The trace continues to each address corresponding to a connected area until a symbol is encountered. The connecting relationship between that symbol and a previously examined and connected symbol, as discussed above, is temporarily stored in the table. When the tracing is executed for all the symbols, the connecting table is completed. Such a connecting table is shown in FIG. 10 where the circles designate connecting points. For example, input terminal Tm1 is connected to the first terminal of resistor R1 and to base terminal B of transistor Tr1. The emitter terminal E of transistor Tr1 is connected to the first terminal of registor R2 and to the emitter terminal E of transistor Tr2.

The completed connecting table is then stored in drawing file 26. An identification number ID, for each drawing, is added in the table. Drawing file 26 can store many connecting tables. When the identification number for a particular drawing is inputed into an input circuit 28, a search circuit 27 searches all the stored connecting tables to locate the desired one. The desired table is supplied to an output circuit 29 which reconstructs the drawing according to the information on the connecting table and displays the desired drawing.

In the above embodiment, an electrical circuit drawing is read by the apparatus. It should be clear, however, the apparatus according to this invention can read drawings of logic circuits, power systems, mask patterns, systems for controlling electrical power or water flow, and mechanical systems. In such cases, the above described forms employing printed lattice pattern must be used. In the above embodiment, the reading of each figure within a unit rectangular area and the identifying process are alternately executed. It is possible, however, to execute both processes in parallel by using two area memories. Furthermore, it is possible to increase evaluation speed by employing two drawing memories and by executing simultaneously the reading of the figures within unit rectangular areas, the identifying process and the editing process. Further, it is possible to replace the two-dimensional light sensor with a line type light sensor.

The above discussion discloses the storing of a connecting table which is finally stored in drawing file 26. From each table a particular circuit can be accessed by search circuit 27 and drawn on an output circuit and device 29 table for each circuit; each table. Other processes, however, can be executed by the present invention. For example, if the user merely wants to order parts, he can determine the kind of components on the drawing and their quantity by skipping the second step. If the user desires to check a scanned drawing, a pattern generator generating the figure pattern according to the code in the drawing memory is used and the output of the pattern generator can be displayed on a cathode ray tube.

Obviously, many modifications and variations of this invention are possible in the light of the above teachings. It is therefore to be understood that within the scope of the appended claims, this invention may be practiced otherwise than as specifically described.

I claim:

1. A machine implemented method for reading symbols on a drawing wherein the drawing comprises a preprinted lattice pattern with orthogonal lines forming unit rectangular areas and each symbol or portion thereof is drawn within one or more of said unit areas, each symbol is drawn so that the portion of the symbol within a unit area has a predetermined size and position with respect to the sides of said unit area, said method comprising the steps of;
scanning several discrete points within each unit area and producing binary data for each scanned point;
storing standard pattern data;
comparing said binary data with said standard pattern data to identify the symbol or symbol portion with the scanned unit area and producing a code representing the symbol or symbol portion when identity is established;
detecting the position of the scanned unit area; and
storing the code at an address defined by said detecting step.

2. An apparatus for reading symbols on a drawing wherein the drawing comprises a preprinted lattice pattern with orthogonal lines forming unit rectangular areas and each symbol or portion thereof is drawn within one or more of said unit areas, each symbol is drawn so that the portion of the symbol within a unit area has a predetermined size and position with respect to the sides of said unit area, said apparatus comprising:
scanning means for scanning several discrete points within each unit area and producing binary data for each scanned point;
storage means for storing standard pattern data;
identifying means coupled to said storage means and said scanning means, for comparing said binary data with said pattern data to identify the symbol or symbol portion within the scanned unit area, said identifying means producing a code representing the symbol or symbol portion when identity is established;
detecting means for detecting the position of the scanned unit area; and,
drawing storage means, coupled to said detecting means and said identifying means, for storing said code at an address defined by said detecting means, said drawing storage means storing a code for each unit area scanned by said scanning means.

3. An apparatus for reading symbols according to claim 2, wherein said scanning means comprises stage moving means for positioning a stage on which the drawing is placed, a light source which irradiates the drawing and a light sensor which receives light reflected from the drawing.

4. An apparatus for reading symbols according to claim 3, wherein said detecting means comprises a counter, said storage moving means positioning the stage according to a number registered in the counter.

5. An apparatus for reading symbols according to claim 2, further comprising editing means for determining the precise symbols drawn on the drawing and the connecting relationship among the symbols.

6. An apparatus for reading symbols according to claim 3, wherein said detecting means comprises first and second counters, said stage moving means positioning the stage in a first direction according to the number in said first counter and in a second direction, orthogonal to said first direction, according to a number in the second direction.

7. An apparatus for reading symbols on a drawing wherein the drawing comprises a preprinted lattice pattern with orthogonal lines forming unit rectangular areas and each symbol or portion thereof is drawn within one or more of said unit areas, and each symbol is drawn so that the portion of the symbol within a unit area has a predetermined size and position with respect to the sides of said unit area, said apparatus comprising:
scanning means for scanning several discrete points within each unit area and producing binary data for each scanned point;
storage means for storing standard pattern data;
identifying means, coupled to said storage means and said scanning means, for comparing said binary data with said pattern data to identify the symbol or symbol portion within the scanned unit area, said identifying means producing a code representing the symbol or symbol portion when identity is established;

detecting means for detecting the position of the scanned unit area;

drawing storage means, coupled to said detecting means and said identifying means, for storing said code at an address defined by said detecting means, said drawing storage means storing a code for each unit area scanned by said scanning means;

editing means coupled to said drawing storage means, for determining the precise symbols drawn on the drawing and the relationship among the symbols;

a drawing file for storing said connecting relationship among the symbols, said drawing file containing a respective identification number for each drawing read by said scanning means;

drawing input means, responsive to a selected identification number, for selecting a corresponding drawing from said drawing file; and drawing output means, coupled to said drawing file and responsive to said selected identification number for reading the connecting relationship among the symbols of said corresponding drawing and reproducing said corresponding drawing.

8. An apparatus for reading symbols according to claim 7, wherein said editing means comprises means for reading codes for each unit area, stored in the drawing storage means, and determining the precise symbols drawn of the drawings and the connecting relationship among the symbols.

* * * * *